United States Patent [19]

Shimomura et al.

[11] Patent Number: 4,984,546
[45] Date of Patent: Jan. 15, 1991

[54] ENGINE CONTROL APPARATUS

[75] Inventors: Setsuhiro Shimomura; Seiji Wataya; Yukinobu Nishimura; Satoru Okubo, all of Hyogo, Japan

[73] Assignee: Mitsubishi Denki Kabushiki Kaisha, Tokyo, Japan

[21] Appl. No.: 363,661

[22] Filed: Jun. 8, 1989

[30] Foreign Application Priority Data

Jun. 8, 1988 [JP] Japan .................................. 63-140996
Jul. 8, 1988 [JP] Japan .................................. 63-171508

[51] Int. Cl.$^5$ ............................ F02P 5/14; F02M 7/00
[52] U.S. Cl. ...................................... 123/425; 123/435
[58] Field of Search ............... 123/435, 436, 425, 419, 123/440, 489

[56] References Cited

U.S. PATENT DOCUMENTS

| | | | |
|---|---|---|---|
| 4,417,556 | 11/1983 | Latsch | 123/435 |
| 4,556,030 | 2/1985 | Aono | 123/435 |
| 4,646,697 | 3/1987 | Grob et al. | 123/436 |
| 4,706,628 | 11/1987 | Trombley | 123/425 |
| 4,896,642 | 1/1990 | Washino et al. | 123/425 |

FOREIGN PATENT DOCUMENTS

| | | | |
|---|---|---|---|
| 0051160 | 3/1984 | Japan | 123/425 |
| 0226254 | 12/1984 | Japan | 123/425 |
| 62-82273 | 4/1987 | Japan | |
| 62-85148 | 4/1987 | Japan | |

Primary Examiner—Tony M. Argenbright
Assistant Examiner—Robert E. Mates
Attorney, Agent, or Firm—Sughrue, Mion, Zinn, Macpeak & Seas

[57] ABSTRACT

An engine control apparatus is provided with a control unit in which a fuel supply quantity $Q_f$ or a ignition timing $\theta_i$ is corrected to maximize an evaluation parameter $A = P_i/(Q_a/N)$ obtained on the basis of a suction air quantity $Q_a$, an engine speed N and a mean effective pressure $P_i$ in a engine, or to maximize a parameter $B = P_i/P_b$ obtained on the basis of a suction pipe pressure $P_b$ and the mean effective pressure $P_i$, or to maximize a maximum pressure $P_{max}$ or a mean effective pressure $P_i$ for every combustion cycle, so that control is performed on the basis of the result of the above correction. The control unit also performs the feedback control of the fuel supply quantity $Q_f$ and corrects the ignition timing by the above-mentioned correction means. Further, the control unit performs feedback control in a predetermined load-operation range of the engine, and stops the feedback control and corrects the fuel supply quantity $Q_f$ out of said predetermined load-operation range of the engine.

2 Claims, 13 Drawing Sheets

ENGINE CONTROL APPARATUS

BACKGROUND OF THE INVENTION

1. Field of the Invention

The present invention relates to an internal combustion engine control apparatus in which maximum power and maximum efficiency can be obtained in spite of scatter in performance of engines.

2. Prior Art

Heretofore, there has been used an apparatus for controlling a fuel injection valve and an ignition device by calculating a proper fuel supply quantity and ignition timing on the basis of the relationship between a suction air quantity or suction pipe pressure and an engine speed (rpm).

Further, a control apparatus designed to perform higher-precision control by detecting the combustion pressure of the engine and adjusting the pressure to a predetermined value has been disclosed in Japanese Pat. Unexamination Publication No. 62-85148.

In this control apparatus, the combustion condition is detected by the output of a cylinder internal pressure (combustion pressure) sensor provided in every cylinder so that the controlling of combustion injection timing, EGR (exhaust gas recycle) valves and the like are carried out to fit the condition in a predetermined pattern.

In the aforementioned prior art apparatus, control is carried out to fit the combustion pressure to a combustion pattern determined in advance by a standard engine. In the case where a large number of engines are mass-produced, there arises considerable scatter. Accordingly, individual engines require individually different combustion patterns. For this reason, it cannot be absolutely said that precision in controlling is improved by controlling the combustion pressure by use of a uniform standard pattern. On the contrary, the performance of the engine may be rather lowered by such control.

Further, in the prior art apparatus, the fuel injection timing, the EGR rate and the like are controlled as operation parameters for controlling the combustion pressure. However, the most effective parameters for the output performance of the engine are the combustion injection quantity and ignition timing optimum thereto.

In general, the freely controllable range of the fuel injection quantity is limited for the purpose of suppressing the component concentration of the exhaust gas to a low level. Accordingly, it is necessary to control the fuel injection quantity and the ignition timing comprehensively to reconcile the components of the exhaust gas and the power performance of the engine.

Further, in a gasoline engine, in order to clean up exhaust gas and improve the output power of the engine, it is necessary to properly control the air-fuel ratio and ignition timing in accordance with the operating condition of the engine. Therefore, a method using a micro-computer to control the air-fuel ratio and ignition timing has been widely used in the field of car gasoline engine.

For example, the air-fuel ratio control based on the quantity of fuel injection is carried out in such a manner as follows. The quantity of suction air ($Q_a$) in the engine is detected by an air-flow sensor provided in an air-intake passage. The engine speed or the number of engine revolutions per unit time ($N_e$) is obtained from the output of a rotation sensor provided on a crankshaft or the like. The quantity of air per engine revolution ($Q_a/N_e$) is calculated and, accordingly, the quantity of basic fuel injection is calculated based on the quantity of air ($Q_a/N_e$). The quantity of basic fuel injection is used for the purpose of obtaining a target air-fuel ratio at every predetermined operation point. Then, a correction is carried out in accordance with the output of a water sensor or the like provided to detect the temperature of engine cooling water to thereby finally decide the quantity of fuel injection. On the basis of an injection pulse signal having a pulse width corresponding to the thus decided fuel injection quantity, an injector is actuated to open its valve in synchronism with the rotation of the engine to inject fuel into, the engine. Further, in a low and partial load range, an air-fuel ratio sensor in which the output thereof rapidly changes in the vicinity of the theoretical air-fuel ratio is used to thereby judge whether the actual air-fuel ratio is on a rich side or on a lean side. A feedback correction based on the judgment is applied to the quantity of fuel injection so that the air-fuel ratio of the engine is controlled so as to be converged into the theoretical air-fuel ratio. By controlling the air-fuel ratio to be always the theoretical air-fuel ratio, cleaning of exhaust gas can be carried out with high efficiency by used of ternary catalystic method.

On the other hand, the control of ignition timing is carried out in such a manner as follows. In general, an ignition timing advance predetermined in the form of a map corresponding to the air quantity ($Q_a/N_e$) and the engine speed ($N_e$) is read. The current conduction of an ignition coil is controlled by an ignition signal based on the thus read-out ignition timing advance.

In general, the ignition timing advance is determined so as to aim at MBT (minimum ignition timing advance required for producing maximum engine torque). Because MBT varies widely according to several factors, such as scatter in engine temperature and air-fuel ration, dimensional error in the combustion chamber, temperature and humidity of suction air and the like, it is difficult to obtain optimum ignition timing continuously by such a simple "open" control method. There exists a problem in that knocking trouble may occur or reduction of torque may occur. Therefore, such an improvement has been proposed as described in Japanese Pat. Unexamination Publication No. 62-82273. The improvement is constructed so that the ignition timing feedback control is carried out on the basis of the measured value of cylinder internal pressure to maximize the engine torque. According to the cylinder internal pressure feedback control method, for example, a rotation sensor is provided to generate a pulse for every degree (1° C.) of crank angle. The output value ($P_0$) of the cylinder internal pressure sensor measured for every pulse generation is read successively, so that mean effective pressure ($P_1$) represented by the following equation is calculated from cylinder volume (V) and piston displacement ($V_n$) corresponding to the currently obtained crank angle.

$$P_1 = \frac{1}{V_n} \int P_0 dV$$

Consequently, the ignition timing feedback control is carried out to maximize $P_1$.

As described above, the conventional cylinder internal pressure feedback controlling method has an attempt to obtain maximum torque by correcting ignition timing to maximize mean effective pressure ($P_i$). However, the air-fuel ratio feedback control is stopped in a high load range, so that "open" control is carried out in the high load range. Accordingly, air-fuel ratio error caused by scatter in characteristics of sensors, injectors and fuels is produced as reduction of torque. Accordingly, it is impossible to draw out the best in the torque of the engine even if cylinder internal pressure feedback control is carried out by correcting ignition timing.

SUMMARY OF THE INVENTION

It is therefore an object of the present invention to provide an engine control apparatus which is capable of controlling the combustion condition of an engine suitably corresponding to the operation condition of the engine and capable of drawing out maximum power and maximum efficiency to thereby solve the aforementioned problem.

It is another object of the present invention to provide an engine control apparatus which is capable of drawing out the best in the torque of the engine even in a high load range by a cylinder internal pressure feedback control method to thereby solve the aforementioned problem.

The engine control apparatus according to the present invention is provided with a control unit in which the fuel supply quantity $Q_f$ or the ignition timing $\theta_i$ is corrected so as to maximize the evaluation parameter $A = P_i/(Q_a/N)$ obtained on the basis of the suction air quantity $Q_a$, the engine speed N and the mean effective pressure $P_i$ in the engine, or to maximize the parameter $B = P_i/P_b$ obtained on the basis of the suction pipe pressure $P_b$ and the mean effective pressure $P_i$, or to maximize the maximum pressure $P_{max}$ or mean effective pressure at $P_i$ at every combustion cycle, so that control is performed on the basis of the result of the above correction.

Also, the internal combustion engine control apparatus according to the invention is provided with a control unit which performs the feedback control of the fuel supply quantity $Q_f$ and corrects the ignition timing by the above-mentioned correction means.

Further, the internal combustion engine control apparatus according to the invention is provided with a control unit which performs feedback control in a predetermined load-operation range of the engine, and stops the feedback control and corrects the fuel supply quantity $Q_f$ in other operation ranges of the engine.

Further, the engine control apparatus according to the present invention comprises: an air-fuel ratio control means for controlling the air-fuel ratio of an engine; an ignition timing control means for controlling the ignition timing of the engine; an air-fuel ratio detection means for detecting the air-fuel ratio of the engine; a load detection means for detecting the load of the engine; a cylinder internal pressure detection means for detecting the internal pressure of a cylinder of the engine; a first cylinder internal pressure feedback control signal generation means responsive to the output of the cylinder internal pressure detection means for generating a first cylinder internal pressure feedback control signal and for applying the first cylinder internal pressure feedback control signal to the ignition timing control means to thereby substantially maximize the output torque of the engine on the basis of the cylinder internal pressure; a load judgment means responsive to the output of the load detection means for judging whether the load of the engine is in a low or partial load range or in a high load range; an air-fuel ratio feedback control signal generation means for generating an air fuel ratio feedback control signal and for applying the air-fuel ratio feedback control signal to the air-fuel ratio control means to thereby converge the air-fuel ratio to a theoretical value when the load judgment means proves that the load of the engine is in the low or partial load range; and a second cylinder internal pressure feedback control signal generation means for generating a second cylinder internal pressure feedback control signal and for applying the second cylinder internal pressure feedback control signal to the air-fuel ratio control means to thereby substantially maximize the torque of the engine when the load judgment means proves that the load of the engine is in the high load range. The apparatus has a feature particularly in that the air-fuel ratio feedback control as well as the ignition timing feedback control is carried out to substantially maximize the torque of the engine in a high load range in which the air-fuel ratio feedback control has not been carried out in the prior art.

The control apparatus according to the present invention obtains the maximum pressure $P_{max}$ or the mean effective pressure $P_i$ for every combustion cycle on the basis of the combustion chamber pressure $P_c$ and the crank angle $\theta_c$, corrects the fuel supply quantity $Q_f$ or the ignition timing $\theta_i$ to maximize at least one of the maximum pressure $P_{max}$, the mean effective pressure $P_i$ and the evaluation parameters A and B, and supplies fuel to the engine on the basis of the corrected fuel supply quantity $Q_f$ or performs ignition control based on the corrected ignition timing $\theta_i$.

Also, the control apparatus according to the invention detects the air-fuel ratio based on the component concentration of a combustion gas detected by the exhaust sensor, performs the feedback control of the fuel supply quantity $Q_f$ to make the air-fuel ratio be a predetermined value, and corrects the ignition timing $\theta_i$ to maximize at least one of the maximum pressure $P_{max}$, the mean effective pressure $P_i$ and the evaluation parameters A and B.

Further, the control apparatus according to the invention detects the air fuel ratio based on the component concentration of a combustion gas detected by the exhaust sensor, perform the feedback control of the fuel supply quantity $Q_f$ to make the air-fuel ratio be a predetermined value, and stops the feedback control in a predetermined load-operation range of the engine and, at the same time, corrects the fuel supply quantity $Q_f$ to maximize at least one of the maximum pressure $P_{max}$, the mean effective pressure $P_i$ and the evaluation parameters A and B.

Further, in a low or partial load range, the air-fuel ratio feedback control means is operated to carry out the air fuel ratio feedback control based on the output of the air-fuel ratio detection means. As this result, the air-fuel ratio of the engine is substantially converged into a theoretical air-fuel ratio. Further, the ignition timing feedback control is carried out based on the output of the cylinder internal pressure detection means to substantially maximize the torque of the engine.

In a high load range, both the ignition timing feedback control and the air-fuel ratio feedback control are carried out based on the output of the cylinder internal pressure detection means. As a result, the internal pressure (combustion pressure) of the cylinder is controlled so that maximum torque can be obtained under the condition that the air-fuel ratio is rich.

DETAILED DESCRIPTION OF THE PREFERRED EMBODIMENTS

Figure 1:
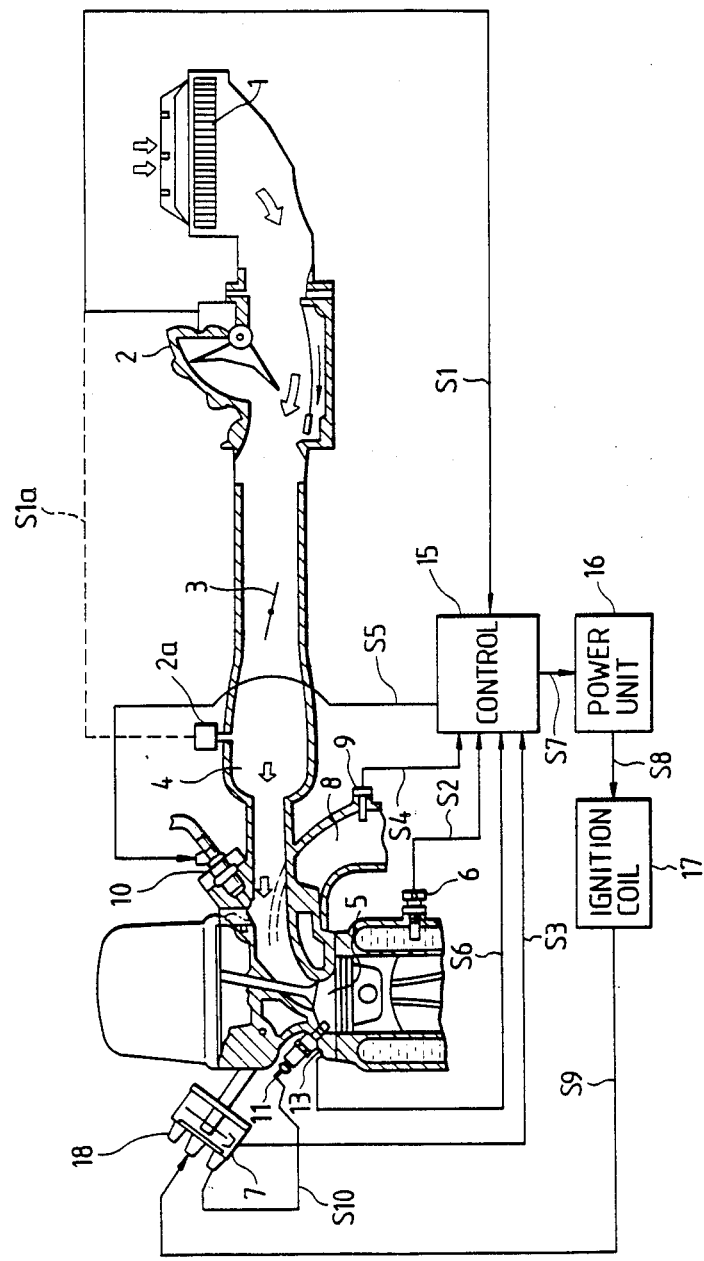
FIG. 1 is a diagram of the internal combustion engine control apparatus as one embodiment of the present invention.

Preferred embodiments of the present invention will be described with reference to the drawings. FIG. 1 is a diagram showing the main construction of an embodiment of the present invention. In the drawing the reference numeral 1 designates an air cleaner; 2, an air-flow meter for measuring the quantity of suction air; 3, a throttle valve; 4, a suction air manifold; 5, a cylinder block; 6, a water temperature sensor for detecting the temperature of engine cooling water; and 7, a crank angle sensor.

The crank angle sensor 7 generates a reference position pulse at every reference position of the crank angle (for example, for every 180 degrees in a 4-cylinder engine or for every 120 degrees in a 6-cylinder engine) and generates a unit angle pulse for every unit angle (for example, for every 1 degree).

The reference numeral 8 designates an exhaust manifold; 9, an exhaust sensor for detecting the component concentration (for example, oxygen concentration) of an exhaust gas; 10, a fuel injection valve; 11, an ignition plug; 13 a cylinder internal pressure sensor (hereinafter referred to as "combustion pressure sensor") for detecting the internal pressure of the cylinder; and 15, a control unit.

In the control unit 15, the instantaneous crank angle can be known by counting the number of unit angle pulses after the input of a reference position pulse.

Further, the engine speed can be known by measuring the frequency or cycle of the unit angle pulses.

Although the embodiment of FIG. 1 has shown the case where the crank angle sensor is provided in a distributor, the invention is applicable to the case where the crank angle sensor is directly connected to a crankshaft.

The reference numeral 2a designates a suction pipe pressure sensor. Any one of the output of the sensor 2a and the output of the air-flow meter 2 is used for the feedback control of the fuel supply quantity and the ignition timing.

Figure 2:
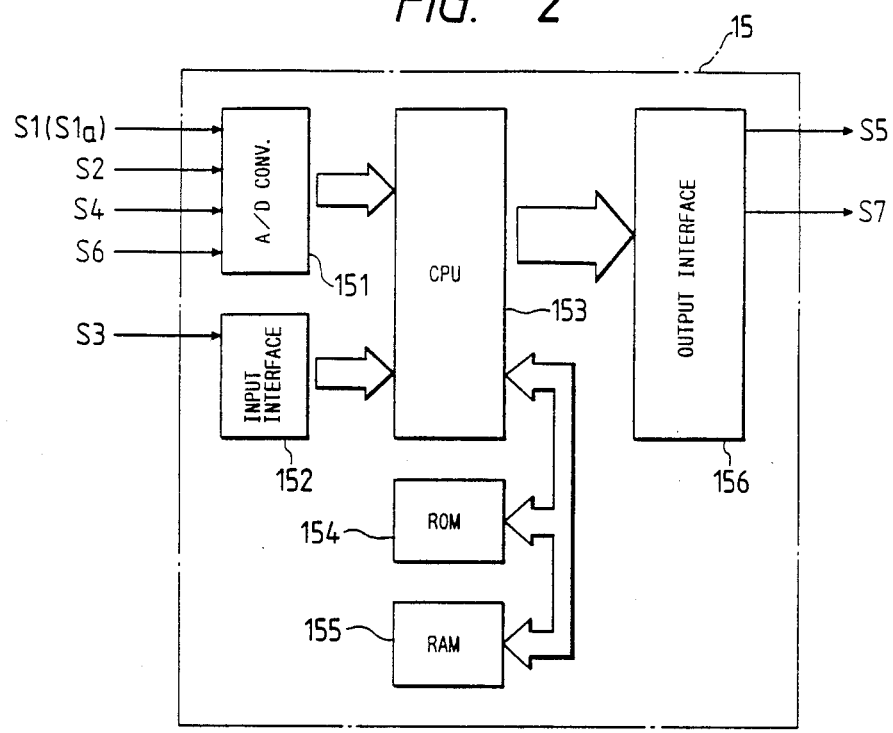
FIG. 2 is a block diagram showing the internal construction of the control unit in the embodiment of FIG. 1.

The control unit 15 has the construction as shown in FIG. 2. In the drawing, the reference numeral 151 designates an A/D (analog-to-digital) converter which receives the output S1 of the air-flow meter 2 or the output S1a of the suction pipe pressure sensor 2a, the output S2 of the water temperature sensor 6, the output S4 of the exhaust sensor 9, and the output S6 of the combustion pressure sensor 13.

The reference numeral 152 designates and input interface which receives the output S3 of the crank angle sensor 7.

The reference numeral 153 designates a CPU which operates together with an ROM 154 and an RAM 155 to process the aforementioned input signal in accordance with a predetermined program.

The reference numeral 156 designates an output interface which receives the output of the CPU 153 and produces its output signals S5 and S6. The output S5 is a pulse signal for actuating the fuel injection valve 10. The fuel supply quantity can be controlled by the pulse width of the pulse signal.

The output S7 is an ignition timing signal which is amplified by a power unit 16. The ignition coil 17 is operated by the output S8 of the power unit 16.

The output S9 of the ignition coil 17 is distributed as an output S10, by the distributor 18, into the ignition plugs 11 respectively provided in the cylinders.

In the following, the operation is described. The basic method for controlling the fuel injection and the ignition timing based on the output of the air-flow meter 2 or the suction pipe pressure sensor 2a in the apparatus of FIG. 1 is well known, and the detailed description thereof will be omitted. The operation related to the present invention will be therefore described in detail.

Figure 3:
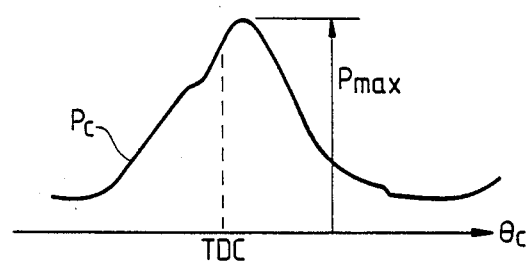
FIG. 3 is a characteristic graph showing an example of the combustion pressure waveform in the embodiment of FIG. 1.

Referring to FIG. 3, the relation between the combustion pressure $P_c$ and the crank angle $\theta_c$ is shown. In FIG. 3, the output S6 of the combustion pressure sensor 13 takes a maximum value in the vicinity of a crank angle upper dead point (TDC). Let the maximum value be $P_{max}$.

Mean effective pressure $P_i$ (cylinder internal pressure) is calculated by integrating the combustion pressure $P_c$ over one cycle as follows.

$$P_i = \frac{\int_0^{v_s} P_c \cdot dV}{V_s} \qquad (1)$$

In the equation (1), $V_s$ is the piston displacement represented by the equation:

$$V_s = \frac{\pi}{4} \times (\text{bore})^2 \times r.$$

Further, V is the cylinder volume and represented by the following equation (2):

$$V = \frac{\pi}{4} \times (\text{bore})^2 \times r\left( (1 - \cos\theta_c) + \frac{l}{4}(1 - \cos 2\theta_c) \right) \quad (2)$$

in which l is the control length, r is the piston stroke and $\theta_c$ is the crank angle.

Accordingly, the following equation (3) is obtained from the equation (2).

$$dV = \frac{\pi}{4} \times (\text{bore})^2 \times r\left( \sin\theta_c + \frac{r}{2l}\sin 2\theta_c \right) \cdot d\theta \quad (3)$$

Accordingly, the mean effective pressure $P_i$ can be calculated by substituting the equation (3) into the equation (1).

The mean effective pressure $P_i$ thus obtained is well known as a parameter for directly detecting the power output of the engine.

Other parameters A and B can be calculated from the mean effective pressure $P_i$, the suction air quantity $Q_a$ of the engine obtained based on the output S1 of the airflow meter 2 or the suction pipe pressure $P_b$ obtained based on the output S1a of the suction pipe pressure sensor 2a, and the engine speed N obtained based on the crank angle. These parameters A and B are also useful as parameters for evaluating combustion energy or efficiency from the quantity ($Q_a/N$ or $P_b$) of suction air per stroke, of the engine.

$$A = P_i/(Q_a/N) \quad (4)$$

$$B = P_i/P_b \quad (5)$$

Figure 4:
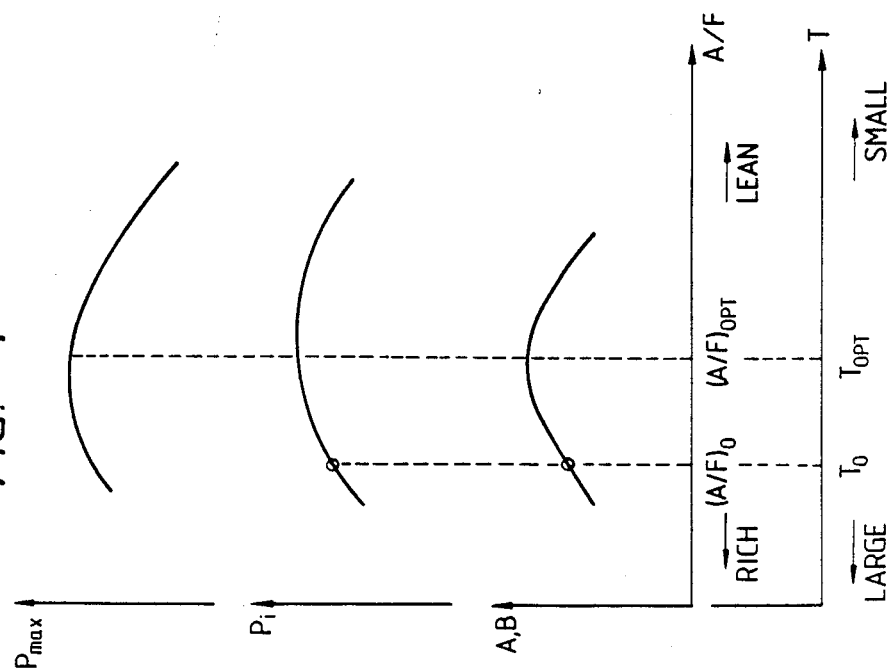
FIGS. 4 and 5 are characteristic graphs showing the relationships between the combustion parameters, the air-fuel ratio and the ignition timing, respectively.
Figure 5:
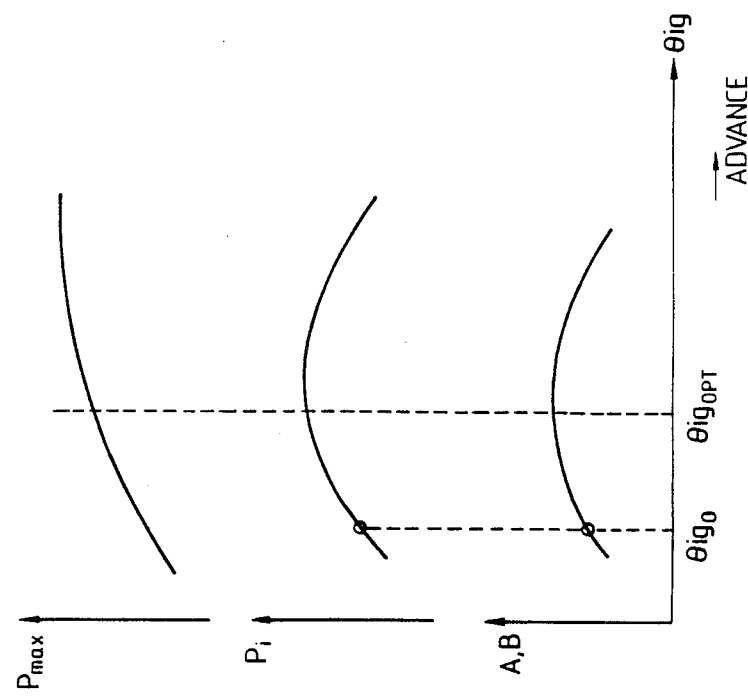

Typical relations between these evaluation parameters ($P_{max}$, $P_i$, A, B), air-fuel ratio and ignition timing are as shown in FIGS. 4 and 5.

As shown in FIG. 4, $P_{max}$ and $P_i$ have maximum values. It is apparent from FIG. 4 that the maximum output power can be obtained by controlling the air-fuel ratio to maximize these parameters.

Further, the evaluation parameters A and B are parameters for expressing combustion energy which can be drawn out from the quantity of suction air per stroke. It is known that optimum efficiency can be obtained by controlling the air-fuel ratio to maximize the parameters A and B.

As shown in FIG. 5, $P_{max}$ increases as the ignition timing $\theta_{ig}$ is advanced, but the mean effective pressure $P_i$ and the evaluation parameters A and B have maximum values.

In the engine having such performance, the maximum power and optimum efficiency can be obtained by controlling the ignition timing to maximize the mean effective pressure $P_i$ and the evaluation parameters A and B.

Figure 6A:
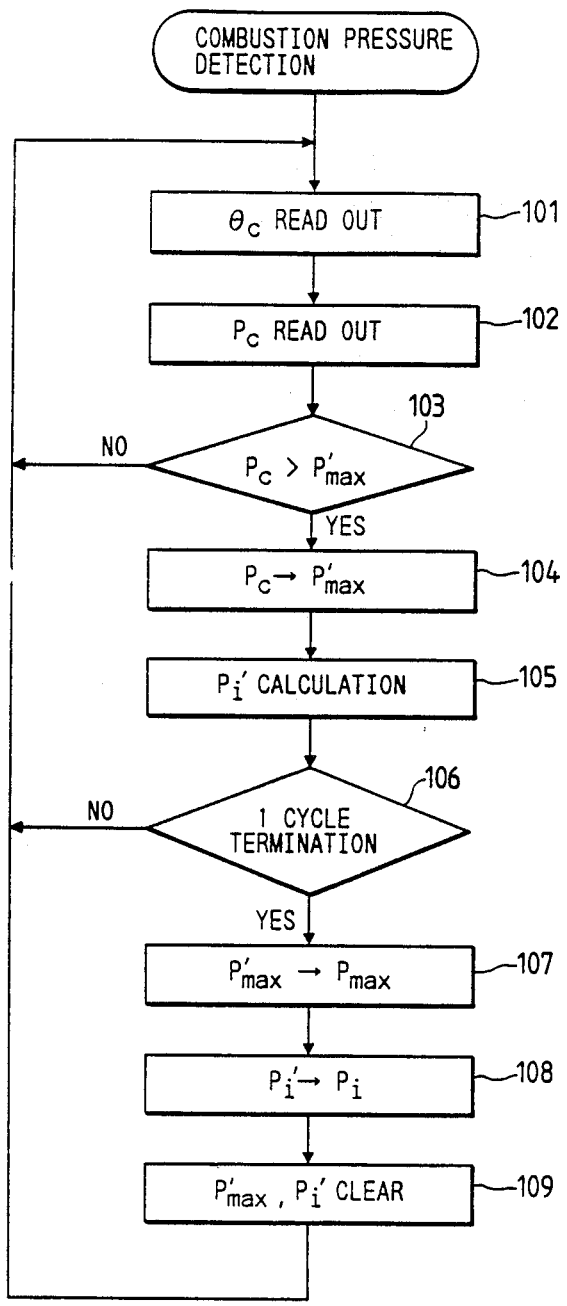
FIGS. 6(a) through 6(c), 7 and 8 are flow charts showing the flow of the operation for performing the maximum value control according to the present invention, respectively.

The aforementioned controlling operation will be described more in detail with reference to the flow charts of FIGS. 6(a) and 6(b). Referring now to FIG. 6(a), there is shown a flow chart for detecting combustion pressure. In the step 101, the output $\theta_c$ of the crank angle sensor is read out. The output of the crank angle sensor may be produced by counting pulses generated for every predetermined degree (for example, 1°) of crank angle or may be produced in the form of a code corresponding to the angle.

Then, in the step 102, the output $P_c$ of the combustion pressure sensor 13 is read out. The reading of $P_c$ is carried out for every predetermined degree (for example, 1°) of crank angle.

Then, in the step 103, a judgment is made as to whether $P_c$ is larger than $P'_{max}$ or not. Because $P'_{max}$ is cleared up in an initial stage of one cycle of combustion, the first read value of $P_c$ is larger than $P'_{max}$. Accordingly, in the step 104, $P_c$ is kept at $P'_{max}$.

Then, in the step 105, the mean effective pressure $P'_i$ is calculated by the aforementioned equation. Then, in the step 106, a judgment by the value of crank angle signal $\theta_c$ is made as to whether one cycle of combustion is terminated or not. When not terminated, the step is returned to the step 101.

As described above, $P'_{max}$ is successively updated to a larger value by the step 104 when $P_c$ increases. When $P_c$ decreases, the procedure of the step 104 is omitted so that the maximum value of $P_c$ in one combustion cycle can be kept at $P'_{max}$.

At the point of time one cycle is terminated, the step is shifted from the step 106 to the step 107. In the step 107, $P'_{max}$ is stored in $P_{max}$. Then, in the step 108 $p'_i$ is stored in $P_i$. Then, in the step 109, $P'_{max}$ and $P'_i$ are cleared up. Thereafter, the aforementioned procedure from the step 101 is repeated for a new cycle.

The aforementioned values of $P_{max}$ and $P_i$ are used in the following fuel control and ignition timing.

Figure 6B:
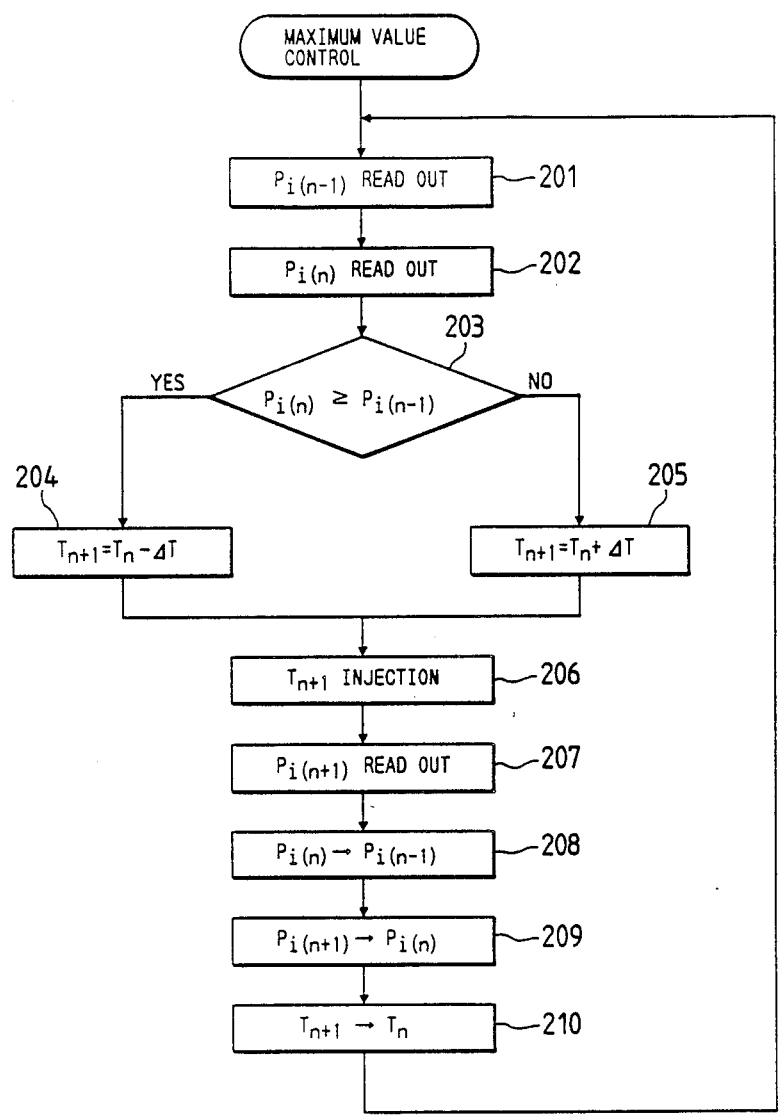

FIG. 6(b) is a flow chart for controlling the fuel injection quantity to maximize the mean effective pressure $P_i$ obtained by the procedure of FIG. 6(a). Though not shown, the initial values $P_{i(0)}$ and $P_{i(1)}$ of the mean effective pressure $P_i$ are set to be zero.

In FIG. 6(b), the step 201 is provided for reading mean effective pressure $P_i$ held in a (n-1)th combustion cycle, that is to say, the reading $P_{i(n-1)}$. Similarly, the step 202 is provided for reading mean effective pressure $P_i$ held in a (n)th combustion cycle, that is to say, for reading $P_{i(n)}$.

Then, in the step 203, the sizes of $P_{i(n)}$ and $P_{i(n-1)}$ are discriminated. Because $P_{i(1)}$ is equal to $P_{i(0)}$ in the initial stage, the step is shifted to the step 204. In the drawing, $T_n$ represents a pulse width by which the fuel injection valve was operated at the last time. In the initial stage, $T_n$ is set to be a pulse width $T_0$. This pulse width $T_0$ corresponds to the reference air-fuel ratio $(A/F)_0$ in FIG. 4. A pulse width $T_1$ for the next combustion cycle is obtained by subtracting $\Delta T$ from the pulse width $T_0$.

Then, in the step 206, the fuel injection valve is operated by the pulse width $T_1$. Because the pulse width $T_1$ is less than the pulse width $T_0$ by $\Delta T$, the air-fuel ratio is shifted to a lean side in FIG. 4 so that the mean effective pressure $P_{i(2)}$ produced by this injection becomes larger than $P_{i(1)}$.

This mean effective pressure $P_{i(2)}$ is read out in the step 207. In the step 208, the mean effective pressure $P_{i(0)}$ is replaced by $P_{i(1)}$. In the step 209, the mean effective pressure $P_{i(1)}$ is replaced by $P_{i(2)}$. Further, in the step 210, the pulse width $T_0$ is replaced by $T_1$. Thereafter, the step is returned to the step 201.

As described above, the pulse width $T_{n+1}$ is reduced whenever $\Delta$ is subtracted by the step 204. Consequently $T_{n+1}$ approaches the pulse width $T_{opt}$ corresponding to the optimum air-fuel ratio $(A/F)_{opt}$ as shown in FIG. 4.

When $T_{n+1}$ is further reduced to be smaller than the pulse width $T_{opt}$, the mean effective pressure $P_i$ is reduced reversely.

Because the relation $P_{i(n)} < P_{i(n-1)}$ is established in the step 203, the step is shifted to the step 205. In the step 205, the pulse width $T_{n+1}$ is reversely set to be larger than the last value $T_n$ by $\Delta T$.

When the aforementioned operation is repeated, the pulse width $T_{n+1}$ is converged in the vicinity of $T_{opt}$ so that the mean effective pressure $P_i$ is adjusted to be in the vicinity of its maximum value. The subtrahend $\Delta T$ is established to be as small as possible. The reason is in that the pulse width $T_{n+1}$ changes widely in the vicinity of $T_{opt}$ as the subtrahend $\Delta T$ increases, to thereby make stable driving in a value sufficiently near $T_{opt}$ impossible.

FIG. 6(b) is a drawing simplified for the purpose of explaining the principle of operation. For this reason, the following operation error may occur.

Assuming now that the pulse width $T_n$ is between $T_0$ and $T_{opt}$, then the pulse width $T_n$ can be converged into $T_{opt}$ by the subtraction shown in the step 204. However, if the addition in the step 205 is mistaken for the subtraction in the step 204, the mean effective pressure $P_i$ decreases and, accordingly, the addition in the step 205 is carried out based on the judgment of the step 203 in the next cycle. Consequently, the pulse width will diverge toward the pulse width $T_0$. The aforementioned problem can be solved logically as shown in FIG. 6(c).

Figure 6C:
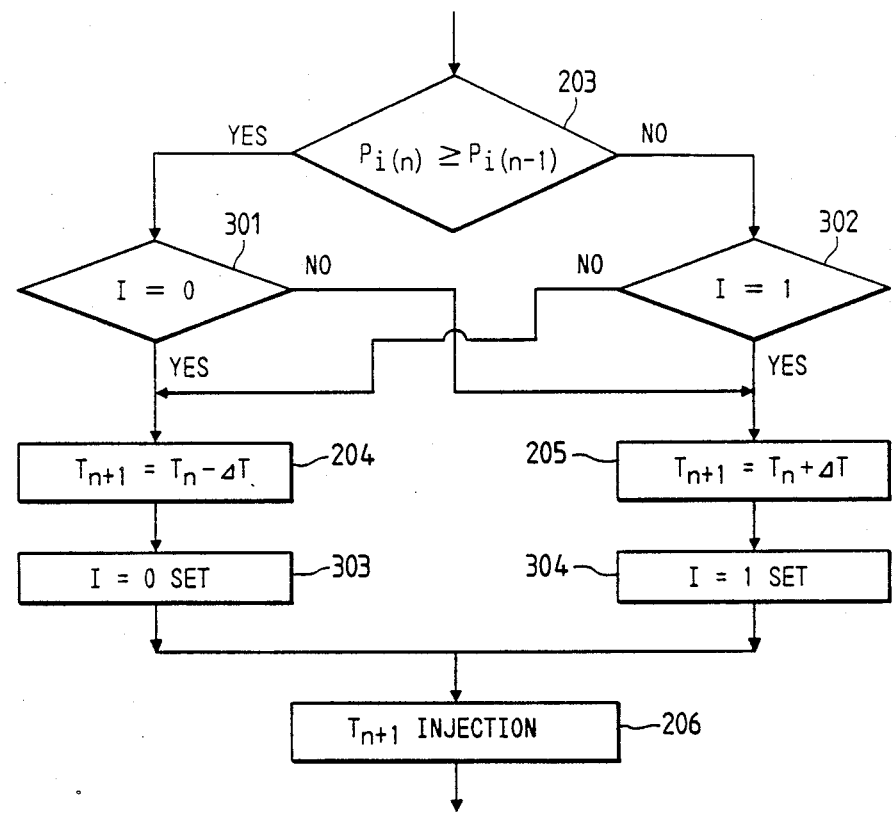

FIG. 6(c) shows the point of improvement. Other portions not shown in FIG. 6(c) are the same as those in FIG. 6(b). In FIG. 6(c), the step 303 is provided for setting the flip-flop I to be 0 when the subtraction is carried out in the step 204. Similarly, the step 304 is provided for setting the flip-flop I to be 1 when the addition is carried out in the step 205. After the procedure of the step 304 or 303, the step is shifted to the step 206.

In the next cycle, the value of the flip-flop I is judged by the steps 301 and 302 after the judgment of the step 203. If the flip-flop I has been set to be 0 when the step is shifted from the step 203 to the step 203, the mean effective pressure $P_i$ has increased as the result of the subtraction. Accordingly, in this case, the subtraction in the step 204 is carried out again to approach the pulse width $T_{n+1}$ to $T_{opt}$.

If the flip-flop I has been set to be 1, the mean effective pressure $P_i$ has increased as the result of the last addition. Accordingly, a decision that the pulse width is on the right side of $T_{opt}$ (that is, $T_{n+1} < T_{opt}$) is made. Accordingly, the step is shifted to the step 205, so that the addition in the step 205 is carried out to approach the pulse width $T_{n+1}$ to $T_{opt}$. The operation in the step 302 is the same as described above.

It is apparent from the above description that the flip-flop I is provided for making a judgment as to whether the pulse width $T_{n+1}$ is on the right side of $T_{opt}$ or not to thereby prevent the pulse width from diverging in the reverse direction as stated preliminarily.

Of course, in the initial stage, the flip-flop I must be set to be 0 as well as the pulse width is set to be $T_0$.

The method for controlling the mean effective pressure $P_i$ by controlling the fuel supply quantity has been described with reference to FIGS. 6(a) through 6(c). The method for controlling the mean effective pressure $P_i$ by the ignition timing $\theta_{ig}$ will be understood easily when the pulse width T shown in the drawings is replaced by the ignition timing $\theta_{ig}$. Accordingly, the detailed description thereof will be omitted.

Similarly, the control method for maximizing the maximum combustion pressure $P_{max}$ and the evaluation parameters $A = P_i/(Q_a/N)$, $B = P_i/P_b$ will be understood easily when the mean effective pressure $P_i$ shown in the drawings is replaced by these parameters. Accordingly, the detailed description thereof will be omitted.

Figure 7:
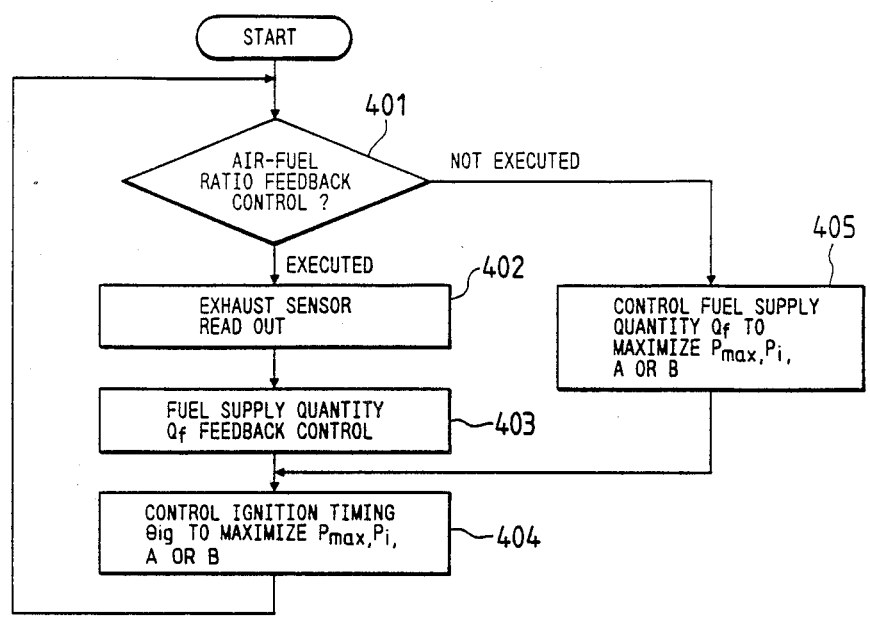

In the following, another embodiment of the present invention in which the aforementioned control method is practically applied is described. FIG. 7 shows an example of the maximum value control according to the present invention in the apparatus for performing feedback control so as to make the air-fuel ratio be a predetermined value by use of the exhaust sensor.

In the drawing, the step 401 is provided for making a judgment as to whether the air-fuel ratio feedback control based on the exhaust sensor can be executed or not. The judgment is made from the operation condition of the engine, the breakdown of the exhaust sensor and the like.

In the case where this control is executed, the step is shifted to the step 402. In the step 402, the output of the exhaust sensor 9 is read out. Then, in the step 403, the fuel supply quantity feedback control is carried out to adjust the output of the exhaust sensor to a predetermined value. The controlling procedure is known commonly and the detailed description thereof will be omitted.

Then, in the step 404, the ignition timing $\theta_{ig}$ is controlled to maximize at least one of the evaluation parameters $P_{max}$, $P_i$, A and B. The control procedure is carried out by the maximum value control as explained above with reference to FIGS. 6(a) through 6(c).

Then, the step is shifted to the step 405, when a decision that the air-fuel ratio feedback control is not executed is made in the step 401. In the step 405 the fuel supply quantity $Q_f$ is controlled to maximize at least one of the evaluation parameters $P_{max}$, $P_i$, A and B. This control operation has been described with reference to FIGS. 6(a) through 6(c).

Then, the ignition timing $\theta_{ig}$ is controlled by the procedure of the step 404. The flow chart of FIG. 7 is constructed so that the maximum value control based on the fuel supply quantity $Q_f$ is not executed while the air-fuel ratio feedback control is executed. In short the component concentration of an exhaust gas is kept in a predetermined level or less, so that the air fuel ratio is controlled preferentially.

Figure 8:
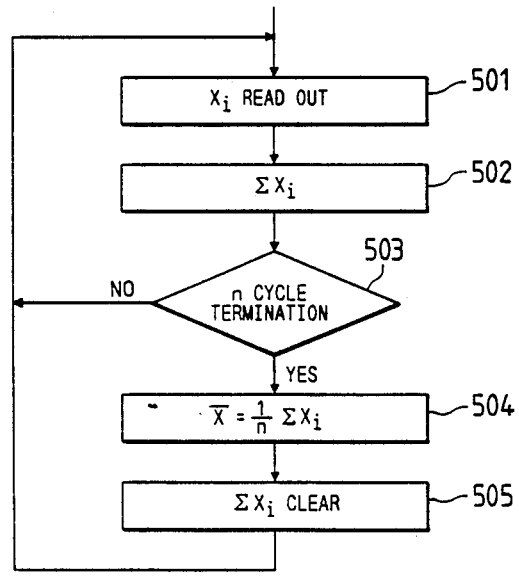

FIG. 8 shows a method for averaging the evaluation parameters used in the aforementioned control. In the drawing, the step 501 is provided for reading the parameter $X_i$ (which is the value of $P_{max}$, $P_i$, A or B in an (i)th cycle of combustion and corresponds to the output of the step 107 or 108 in FIG. 6(a)). In the step 502, the parameter $X_i$ is integrated successively.

The step 503 is provided for making a judgment as to whether the number of integrating operations has reached n (cycles) or not. If the number has not reached n, the step is shifted to the step 504 in which the average value X is obtained by dividing the integrated value by n. The control in FIGS. 6(b), 6(c) and 7 is carried out by the average value X. The averaging is made in consideration of the case where the combustion pressure $P_c$ or the evaluation parameter $P_{max}$, $P_i$, A or B changes slightly to thereby interfere with the maximum value control though the engine is operated in the same fuel supply quantity $Q_f$ and in the same ignition timing $\theta_{ig}$.

Considering the fact that learning speed becomes slower because of the averaging, it is necessary to determine n within a range allowable for the control. After the averaging, the integrated value is cleared up in the step 505.

Although FIG. 8 shows a simple arithmetic averaging method, other known methods such as a weighted averaging method and a moving averaging method can be used.

In the maximum value control as explained above, it is desired that the controllable range related to the ignition timing control and the fuel supply quantity control is limited. The reason is that lagging ignition timing causes an accidental fire or injury due to overheating of an exhaust gas and, on the contrary, leading ignition timing causes lowering of output power or injury due to abnormal combustion. In the case where the fuel supply quantity is too much or in the case where the fuel supply quantity is too little, the same trouble occurs.

The limitation can be realized by controlling the ignition timing $\theta_{ig}$ and the fuel injection pulse width by upper and lower limits when they are beyond the upper and lower limits. The logic is simple and description with reference to the drawing will be omitted.

As described above with reference to FIG. 6(b), the addend or subtrahend $\Delta T$ (or $\Delta \theta_{ig}$ in the case of ignition timing) used for every cycle must be established to be as small as possible.

However, the fact that the addend or subtrahend is small means that the pulse width (ignition timing) is converged into an optimum value slowly. Accordingly, the fact is unsuitable for the control of the engine in which the operating condition changes continuously.

To solve such a problem, the operating condition of the engine is separated into zones by the operation parameter. The maximum value control by means of the injection pulse width $T_n$ or the ignition timing $\theta_{ig(n)}$ is carried out for every zone. The results of the control, that is, $T_n$ and $\theta_{ig(n)}$ are stored in memories provided corresponding to the zones. The memories may be capable of storing the results continuously after the power supply is cut.

In this case, the correction of the control parameters $T_n$ and $\theta_{ig(n)}$ can be started from the vicinity of the respective optimum values when the engine is restarted or when the engine operating condition is shifted from one to another. Accordingly, the rate of convergence can be improved so that preferable control can be made.

To realize this control, the RAM 155 in FIG. 2 can be provided as a nonvolatile memory or the power supply for the RAM 155 can be backed up by a battery to keep the contents of the RAM 155.

Figure 9:
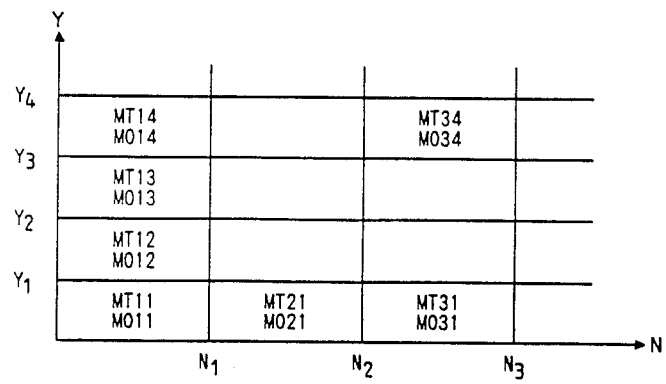
FIG. 9 is an explanatory view showing an example of the zone separation of the operation condition and the assignment of the memories.

FIG. 9 is a view showing an example of the zone separation of the operation condition and the assignment of the memories. In the drawing, the abscissa expresses the engine speed N which is separated into $N_1$, $N_2$ and $N_3$. The ordinate Y expresses parameter showing the load of the engine. The suction air quantity $Q_a$, the value $Q_a/N$ obtained by dividing the suction air quantity $Q_a$ by the engine speed N, suction pipe pressure $P_b$ and the like are used as the parameter. The ordinate Y is similarly separated into $Y_1$, $Y_2$, $Y_3$ and $Y_4$.

Zone separation is carried out by N and Y so that memories $MT_{l,m}$ and $M\theta_{l,m}$ are assigned corresponding to the respective zones. In FIG. 9, $M_T$ represents a memory for keeping the control parameter $T_n$, $M\theta$ represents a memory for keeping the control parameter $\theta_{ig(n)}$, and l and m represent separation numbers in the abscissa and the ordinate, respectively.

In the case where the operation condition is in these zones, the maximum value control is carried out so that the control parameters are temporarily written in the memories $M_T$ and $M\theta$ and kept therein. Although FIG. 9 shows the case where the operation condition is separated into zones by two-dimensional parameters of the engine speed N and the parameter Y showing the load of the engine, it is a matter of course that the operation condition can be separated into zones by a single parameter N or Y.

The logic of control in FIG. 9 is simple and the description thereof with reference to the drawing will be omitted.

The control parameters stored in the memories $M_T$ and $M\theta$ can be converted into proper values when the engine is stably operated in a corresponding zone.

In the case where acceleration and deceleration are repeated on the engine, however, the maximum value control may be carried out corresponding to the transient state of combustion so that aberrant values may be stored in the memories.

Figure 10:
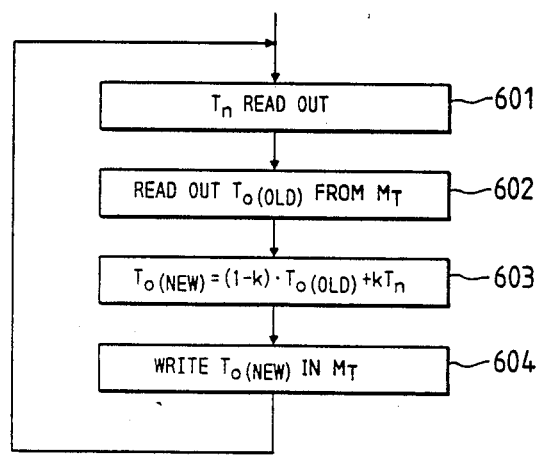
FIG. 10 is a flow chart showing the flow of the operation in a transient state according to the present invention.

To solve such a problem, a filter as shown in FIG. 10 can be used. In FIG. 10, the step 601 is provided for reading the pulse width $T_n$ (the value of the step 210 in FIG. 6(b)) as one of the maximum value control parameters. Then, in the step 602, the last value $T_o$(old) which has been stored in the memory $M_T$ is read. In the step 603, the following arithmetic operation is carried out based on $T_n$ and $T_o$(old).

$$T_o(\text{new}) = (1-K) \cdot T_o(\text{old}) + KT_n$$

In the arithmetic operation, K satisfies the relation $0 < K \leq 1$.

The meaning of this arithmetic operation is that a value $T_o$(new) to be newly kept in the memory is produced so that K times the currently obtained result $T_n$ is reflected in the memory. The value of K is determined by even balance between the suitable convergence speed of the value to be kept in the memory and the suppression of aberrant correction value in the transient state.

Then, in the step 604, the pulse width $T_o$(new) is written in the memory $M_T$. Thereafter, the step is returned to the step 601. The value $T_o$ stored in the memory $M_T$ is used as an initial value of pulse width $T_n$ when the maximum value control of FIG. 6(b) starts.

In FIG. 10, the steps 601 to 604 may be circulated in synchronism with the maximum value control of FIG. 6(b) or may be circulated in a more lagging cycle.

Although FIG. 10 shows the case where the pulse width $T_n$ is used as one of the control parameters, it is a matter of course that the ignition timing $\theta_{ig(n)}$ can be stored in the memory M in the same manner as described above.

The execution of the aforementioned maximum value control had better stop when the operation of the combustion pressure sensor 13 is abnormal. Accordingly, a range of output value obtained from the combustion pressure sensor 13 which is in a normal state had better be determined in advance so that a flag for inhibiting the maximum value control can be set when a value beyond the range is obtained from the combustion pressure sensor 13. In short, the flag is read when the maximum value control starts, so that the control is inhibited when the flag is in a set state. This logic is simple and the description thereof with reference to the drawing will be omitted.

The judgment as to whether the output of the combustion pressure sensor 13 is normal or not can be made by using at least one of the combustion pressure $P_c$ directly obtained from the combustion pressure sensor 13, the maximum value $P_{max}$ of the combustion pressure $P_c$ and the mean effective pressure $P_i$.

Figure 11:
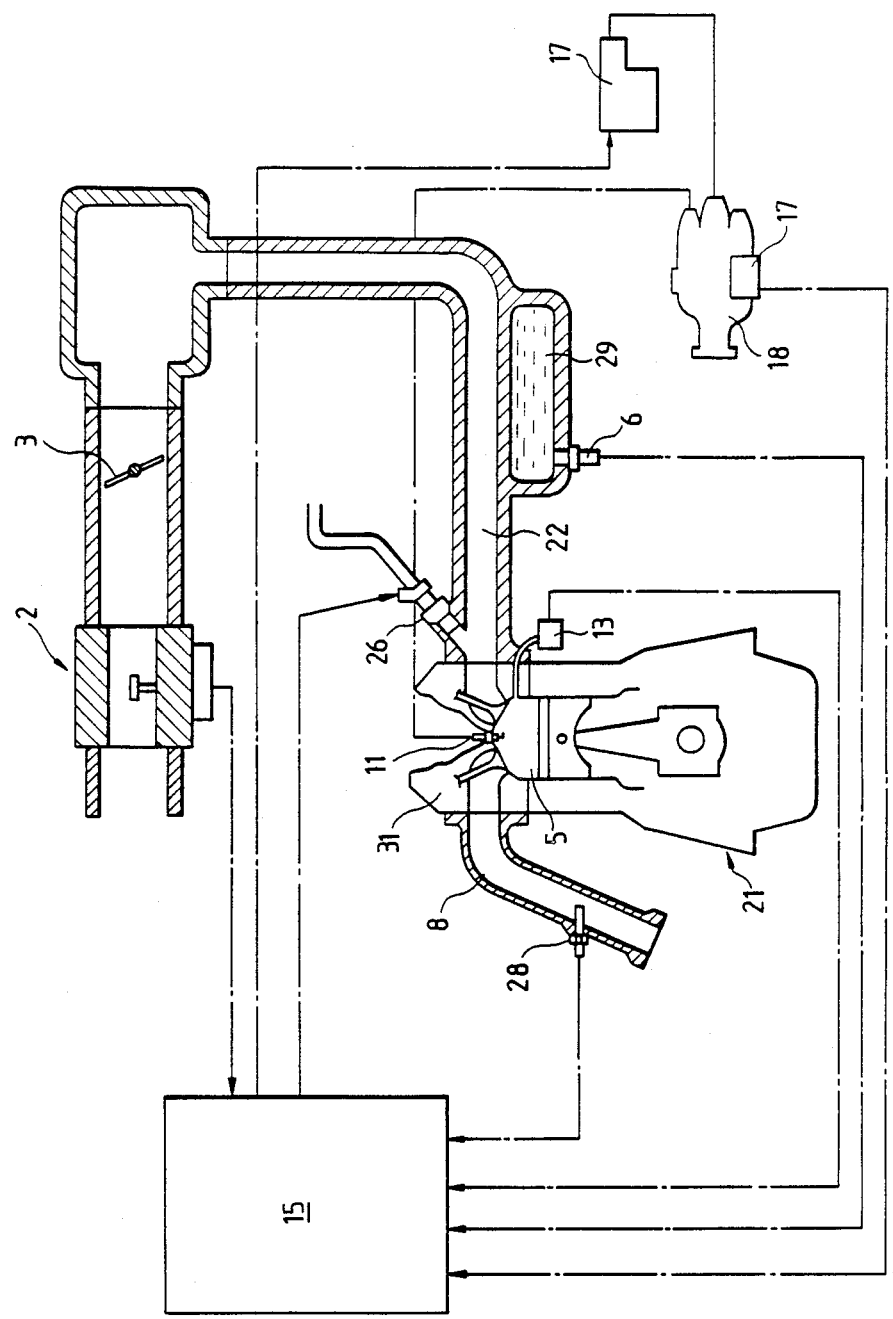
FIG. 11 is a diagram showing the whole configuration of the engine control apparatus according to another embodiment of the present invention.

FIG. 11 is a diagram showing the engine control apparatus according to another embodiment of the present invention.

In this embodiment, a throttle valve 3 for adjusting the inflow of air is provided in an air-intake passage 22 of an engine 21. An air-flow sensor 2 for detecting the inflow of air is provided in an upstream side of the air-intake passage 22. An injector 26 for injecting fuel toward a combustion chamber 5 is connected to the air-intake passage 22. An air-fuel ratio sensor ($O_2$ sensor) 28 for detecting the oxygen concentration of exhaust gas to generate a detection signal which changes widely by reference to a theoretical air-fuel ratio is provided in an exhaust passage 8 of the engine 21. A water temperature sensor 6 is provided in a tank 29 filled with water for cooling the engine. An ignition plug 11 for igniting a mixed gas in the combustion chamber 5 is provided in a cylinder head 31 of the engine 21. A cylinder internal pressure sensor 13 for detecting pressure in the combustion chamber 5 is further provided in the cylinder head 31. The ignition plug 11 is electrically connected to an ignition coil 17 through a distributor 18 which is provided with a rotation sensor 16 for detecting the rotation of the engine.

Figure 12:
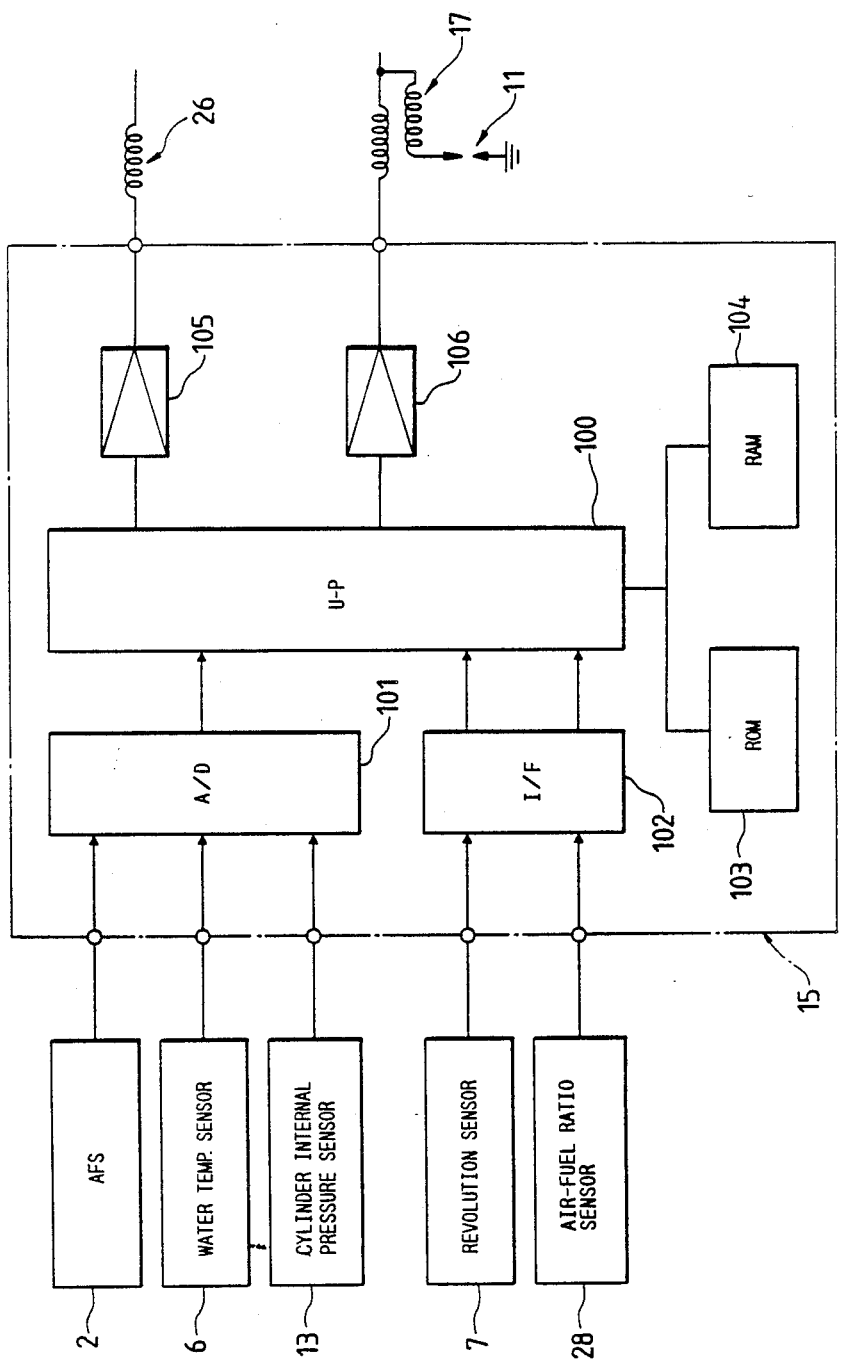
FIG. 12 is a partly block diagram showing the embodiment.

The injector 26 and the ignition coil 17 are controlled by a control unit 15. The control unit 15 receives various detection signals from the air-flow sensor 2, the cylinder internal pressure sensor 13, the rotation sensor 16 and the air-fuel ratio sensor 28. As shown in FIG. 12, the control unit 15 is composed of a CPU 100, an A/D converter 101 for converting various analog input signals into digital signals and for supplying those digital signals to the CPU 100, an input ROM 103 for storing in advance the procedure for controlling the CPU 100, an RAM 104 for use in the arithmetic process of the CPU 100, and output circuits 105 and 106 for supplying control signals to the injector 6 and the ignition coil 17 respectively.

Figure 13:
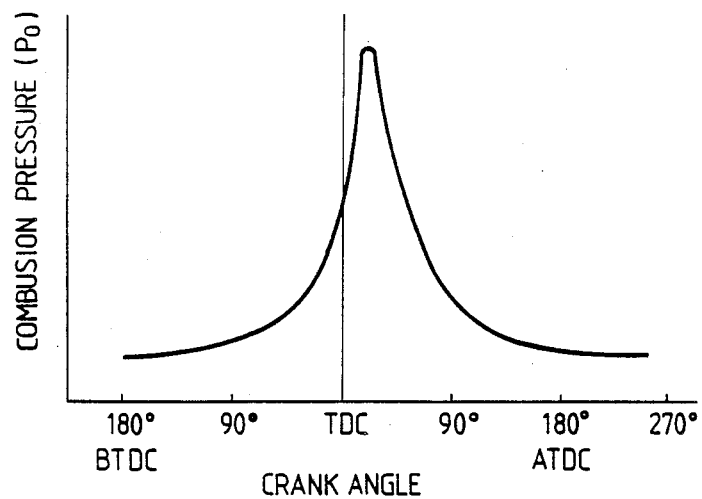
FIGS. 13 through 15 are characteristic graphs for explaining the controlling operation of the embodiment, respectively.
Figure 14:
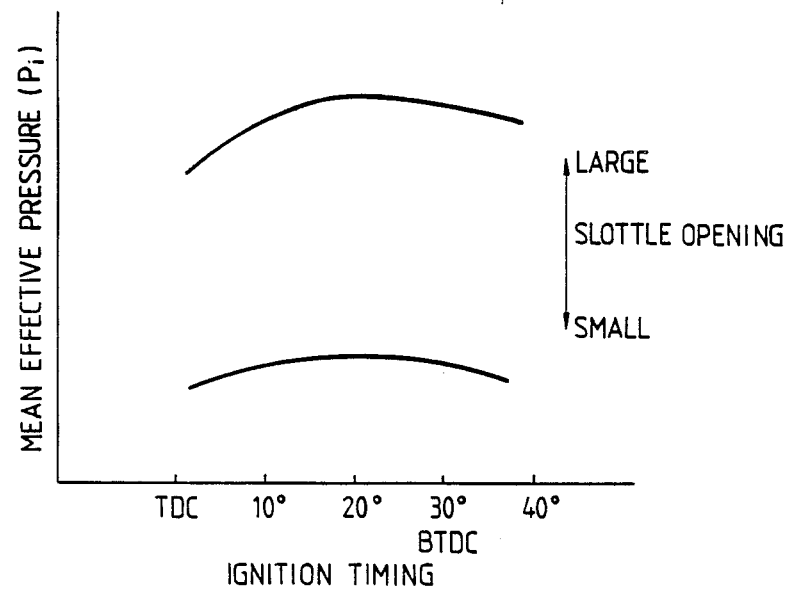

FIG. 13 is a graph of combustion pressure ($P_0$) versus Crank angle. FIG. 14 is a characteristic graph showing the condition in which mean effective pressure ($P_i$) obtained from the relationship between combustion pressure $P_0$ and crank angle is changed corresponding to the change of ignition timing. In the present invention, a control operation is carried out so that the crank angle having the maximum value of $P_1$ can be used as target ignition timing. In particular, in a high load range, the air-fuel ratio feedback control is carried out so that the maximum value of $P_1$ becomes highest.

Figure 15:
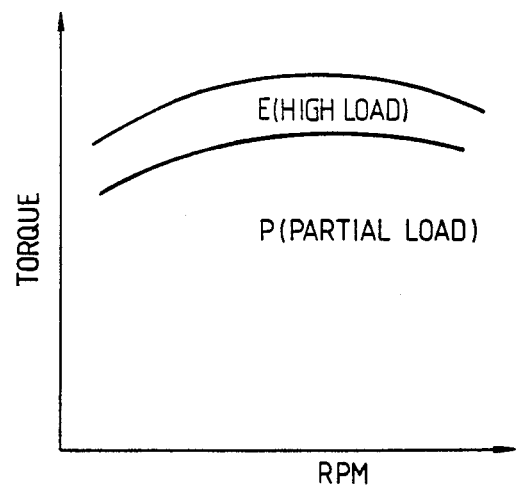

The control unit 15 calculates the quantity ($Q_a$) of suction air ($Q_a$) and the engine speed ($N_e$) and judges the load on the basis of the value $Q_a/N_e$. When the load is not larger than a predetermined value, that is to say, when the load is in the range of P in FIG. 15, ordinary fuel injection control is carried out and, at the same time, the ignition timing feedback control based on the internal pressure of the cylinder is carried out to obtain the maximum value of mean effective pressure ($P_i$) in a stationary state. On the contrary, when the load is larger than the predetermined value, that is to say, when the load is in the range of E in FIG. 15, the ignition timing feedback control based on the internal pressure of the cylinder is carried out to obtain the maximum value of $P_1$ in a stationary state and, at the same time, fuel cylinder is carried out to maximize $P_1$.

Figure 16:
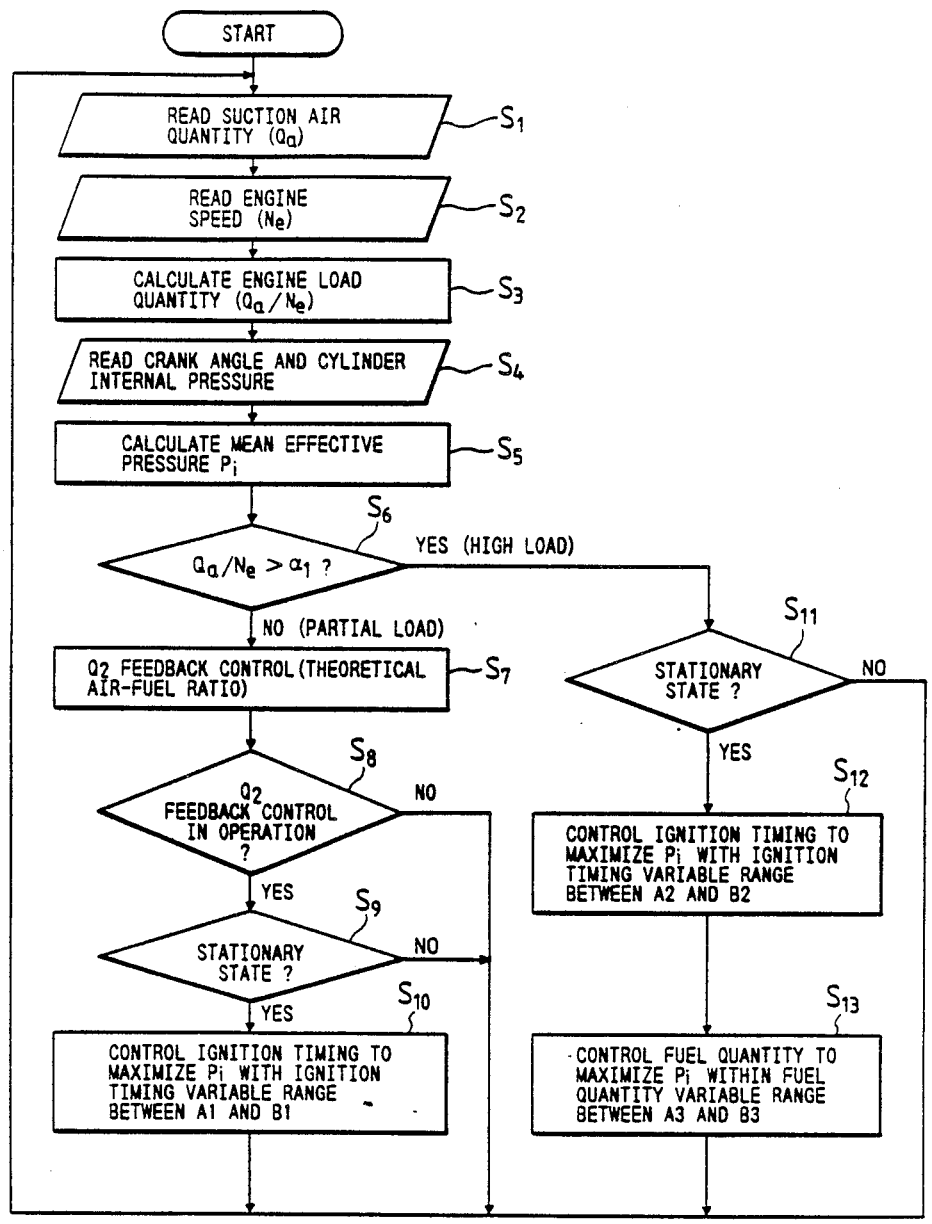
FIG. 16 is a flow chart for execution of the controlling operation of the embodiment.

In the following, the control operation of this embodiment is described more in detail with reference to the flow chart of FIG. 16. In the drawing, symbols $S_1$ to $S_{13}$ designate various steps respectively.

At the start, the quantity of suction air ($Q_a$) is read in the step $S_1$. In this step, analog signals from the air-flow sensor 2 are converted into digital values by the A/D converter 101 so that, if necessary, the digital values are averaged as the quantity of suction air ($Q_a$).

Then, the engine speed ($N_e$) is read in the step $S_2$. In this step, $N_e$ is obtained by reading and measuring the interval of the pulse signals of the rotation sensor 16.

Then, the quantity of air per engine revolution ($Q_a/N_e$) is calculated corresponding to the quantity of load of the engine in the step $S_3$.

Then, in the step $S_4$, the output signal of the cylinder internal pressure sensor 13 is read whenever a crank angle signal is generated from the rotation sensor 16. In the step $S_5$, mean effective pressure ($P_i$) is calculated based on the values of the output signals of the cylinder internal pressure sensor 13.

Then, in the step $S_6$, the judgment of load is carried out by judging whether the value of $Q_a/N_e$ is larger than a predetermined value $\alpha_1$ or not.

If $Q_a/N_e$ is not larger than $\alpha_1$, the judgment proves that the load is in the partial load range so that the step is shifted from $S_6$ to $S_7$. In the step $S_7$, the air-fuel ratio feedback control ($O_2$ feedback control) is carried out based on the output signal of the air-fuel ratio sensor 28.

Then, in the step $S_8$, a judgment is carried out as to whether the $O_2$ feedback control is in operation or not. If the answer is "YES", the step is shifted to $S_9$. In the step $S_9$, a judgment is carried out as to whether the load is in a stationary state or not. The judgment as to whether the $O_2$ feedback control is in operation or not is based on the judgment as to whether various conditions, such as water temperature conditions and air-fuel ratio sensor ($O_2$ sensor) activating conditions, are satisfied or not. In general, the conditions of the judgment are used in ordinary fuel injection control. On the other hand, the judgment of stationary state is based on the judgment as to whether the absolute value of the deviation of $Q_a/N_e$ per unit time is less than a predetermined value or not ($Q_a/N_e$ may be replaced by $Q_a$). In other words, the judgment of stationary state is based on the judgment as to whether road conditions and the quantity of displacement of the accelerator are constant or not.

If the judgment proves that the driving condition is in a stationary state in the step $S_9$, ignition timing is controlled to maximize $P_i$. The ignition timing control is carried out within a variable range between a lower limit $A_1$ and an upper limit $B_1$.

If the judgment proves that the $O_2$ feedback control is not in operation in the step $S_8$ or if the judgment proves that the driving condition is not in a stationary state in the step $S_9$, the step is returned to the initial step $S_1$.

Then, if the relation $Q_a/N_e > \alpha_1$ is satisfied in the step $S_6$, that is to say, if the load is in a high load range, the step is shifted to the step $S_{11}$ to judgment whether the driving condition is in a stationary state or not. The judgment in the step $S_{11}$ is the same as the judgment in the step $S_9$.

Then, if the judgment proves that the driving condition is in a stationary state in the step $S_{11}$, the step is shifted to $S_{12}$. In the step $S_{12}$, ignition timing is controlled to maximize $P_i$. In this case, the ignition timing control is carried out within a variable range between a lower limit $A_2$ and an upper limit $B_2$. Although the air-fuel ratio feedback control is carried out in the partial load range, the change of air-fuel ratio is large in the high load range. Accordingly, the variable range of ignition timing in the high load range is less than the variable range of ignition timing in the partial load range. For example, the variable range of ignition timing in the high load range is from $-5°\ _{CA}$ ($A_2$) to $+5°\ _{CA}$ ($B_2$) and the variable range of ignition timing in the partial load range is from $-10°\ _{CA}$ ($A_1$) to $+10°\ _{CA}$ ($B_1$).

Then, the step is shifted to $S_{13}$ to control the quantity of fuel to maximize $P_i$. The fuel control is carried out within a variable range between a lower limit $A_3$ and an upper limit $B_3$.

Although the aforementioned embodiment has shown the case where the feedback control is carried out based on mean effective pressure calculated, as a value corresponding to the torque of the engine, from detection values of internal pressure of the cylinder, the invention is applicable to the case where the feedback control of the ignition timing and the air-fuel ratio may be carried out by using as a standard parameter the crank angle at which the internal pressure of the cylinder takes a peak value, to obtain highest torque.

Although the aforementioned embodiment has shown the case where the air-fuel ratio is controlled by controlling the quantity of fuel injection, the means for controlling air-fuel ratio is not limited to the fuel injection controlling method.

The present invention is realized in the form of other embodiments.

As described above, according to the first invention, ignition control is carried out based on the fuel supply quantity $Q_f$ or the ignition timing $\theta_i$ to maximize at least one of the maximum pressure $P_{max}$, the mean effective pressure $P_i$ and the evaluation parameters A and B for every combustion cycle. Further, according to the second invention, feedback control of the fuel supply quantity $Q_f$ is carried out to make the air-fuel ratio be a predetermined value and, at the same time, the ignition timing $\theta_i$ is corrected to maximize at least one of the maximum pressure $P_{max}$, the mean effective pressure $P_i$ and the evaluation parameters A and B. Further, according to the third invention, feedback control of the fuel supply quantity $Q_f$ is carried out to make the air-fuel ratio be a predetermined value, while the feedback control is stopped in a predetermined range of the engine load and, at the same time, the fuel supply quantity $Q_f$ or the ignition timing $\theta_i$ is corrected to maximize at least one of the maximum pressure $P_{max}$, the mean effective pressure $P_i$ and the evaluation parameters A and B. Accordingly, maximum output power and maximum efficiency can be obtained in spite of scatter in performance of engines.

In addition, power and efficiency can be improved while interference between the air-fuel ratio feedback control based on the exhaust sensor and the maximum value control based on the combustion parameter is suppressed and, at the same time, the component concentration of exhaust gas is kept in a predetermined level or less.

Further, because the present invention is configured as described above, the air-fuel ratio feedback control as well as the ignition timing feedback control can be made in accordance with the internal pressure of the cylinder even in a high load range where the air-fuel ratio feedback control could not be made in the prior art. Consequently, the best in the torque of the engine can be brought out.

What is claimed is:

1. An internal combustion engine control apparatus comprising:

an air-flow meter for measuring a suction air quantity $Q_a$ of an engine;

a suction pipe pressure sensor for detecting suction pipe pressure $P_b$ of said engine;

a crank angle sensor for detecting the revolution angle $\theta$ of said engine;

at least one cylinder internal pressure sensor for detecting combustion chamber pressure $P_c$ of said engine; and a control unit which comprises;

means for obtaining a fuel supply quantity $Q_f$ and an ignition timing $\theta i$ from an engine speed N and one of said suction air quantity $Q_a$ and said suction pipe pressure $P_b$;

means for obtaining at least one of maximum pressure value $P_{max}$, a mean effective pressure $P_i$, a first evaluation parameter $A = P_i(Q_a/N)$ and a second evaluation parameter $B = P_i/P_b$, said maximum pressure $P_{max}$ and said means effective pressure $P_i$ being calculated from said combustion chamber pressure and said revolution angle $\theta_c$ for every combustion cycle, said first evaluation parameter A being calculated from said suction air quantity $Q_a$, said engine speed N and said mean effective pressure $P_i$, said second evaluation parameter B being calculated from said suction pipe pressure $P_b$ and said mean effective pressure $P_i$; and means for correcting at least one of said fuel supply quantity $\theta_f$ and said ignition timing $\theta_i$ to maximize said at least one of said maximum pressure value $P_{max}$, said mean effective pressure $P_i$, and said first and second evaluation parameters A and B;

means for controlling one of a fuel supply quantity and an ignition timing on the basis of a corrected value obtaining from said correcting means; and an exhaust sensor for detecting the component concentration of a combustion gas, wherein said control unit further comprises means for obtaining an air-fuel ratio based on the component concentration of the combustion gas detected by said exhaust sensor, and means for performing a feedback control of said fuel supply quantity $\theta_f$ to set said air-fuel ratio to a predetermined value, said correcting means corrects said ignition timing $\theta_i$ to maximize said at least one of said maximum pressure value $P_{max}$, said mean effective pressure $P_i$, and said first and second evaluation parameters A and B; and wherein in a predetermined load-operation range of said engine, said feedback control and the correlation of said ignition timing $\theta_i$ are executed whereas out of said load-operation range of said engine, said feedback control is stopped and said ignition timing $\theta_i$ is corrected to maximize at least one of said maximum pressure $P_{max}$, said mean effective pressure $P_i$ and said first and second evaluation parameters A and B.

2. An engine control apparatus comprising:

air-fuel ratio control means for controlling an air-fuel ratio of an engine;

ignition timing control means for controlling the ignition timing of said engine;

air-fuel ratio detection means for detecting the air-fuel ratio of said engine;
load detection means for detecting the load of said engine;
cylinder internal pressure detection means for detecting the internal pressure of at least one cylinder of said engine;
first feedback control signal generation means responsive to the output of said cylinder internal pressure detection means for outputting a first feedback control signal to said ignition timing control means to substantially maximize the output torque of said engine on the basis of the cylinder internal pressure detected by said cylinder internal pressure detection means;
load judgment means responsive to the output of said load detection means for judging whether the load of said engine is in a low or partial load range or in a high load range.
air-fuel ratio feedback control signal generation means for outputting an air-fuel ratio feedback control signal to said air-fuel ratio control means to converge the air-fuel ratio detected by said air-fuel ratio detection means to a theoretical value when said load judgment means judges that the load of said engine is in said low or partial load range; and
second feedback control signal generation means responsive to the output of said cylinder internal pressure detection means for outputting a second feedback control signal to said air-fuel ratio control means to substantially maximize the torque of said engine when said load judgment means judges that the load of said engine is in said high load range.

* * * * *